No. 634,364. P. I. MOULE. Patented Oct. 3, 1899.
SHEEP HOOK.
(Application filed Sept. 22, 1897.)
(No Model.)
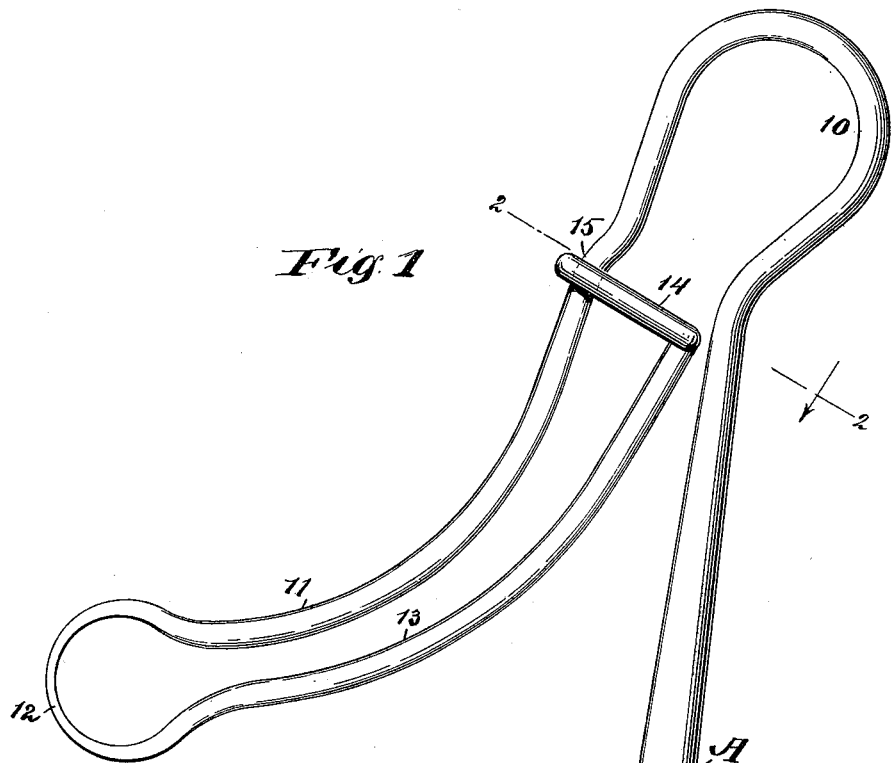
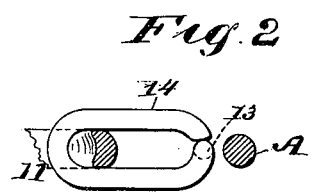
WITNESSES:
INVENTOR
P. I. Moule.
BY
ATTORNEYS.

UNITED STATES PATENT OFFICE.

PHILIP I. MOULE, OF BERCAIL, MONTANA.

SHEEP-HOOK.

SPECIFICATION forming part of Letters Patent No. 634,364, dated October 3, 1899.

Application filed September 22, 1897. Serial No. 652,536. (No model.)

*To all whom it may concern:*

Be it known that I, PHILIP I. MOULE, of Bercail, in the county of Fergus and State of Montana, have invented a new and Improved Sheep-Hook, of which the following is a full, clear, and exact description.

The object of the invention is to so construct a sheep-hook that the leg of a sheep may be readily caught thereby and held therein as long as desirable, it being practically impossible for the animal to free itself.

Another object of the invention is to so construct a sheep-hook that while holding an animal fast it will not injure the leg, and so that the hook will automatically receive and lock the leg in position in the device, while the operator may expeditiously and conveniently release the animal when necessary.

A further object of the invention is to construct a sheep-hook in an exceedingly simple yet durable and economic manner.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1 is a side elevation of the improved sheep-hook, and Fig. 2 is a horizontal section taken on the line 2 2 of Fig. 1.

The shank A of the hook is tapering and is secured in any approved manner upon a staff or handle B. The upper end of the shank is continued in the form of a rod which is bent upon itself to form an open loop 10, the material whereof may be flat, the rod at one end of the open loop being carried downwardly and outwardly on a curved line, forming an arm or a crook 11, having a concaved upper and a convexed lower face. The material of the arm 11 is preferably reduced and flattened and bent upon itself to form a second open loop 12, smaller than the open loop 10 and more of a circular form, and the material of which the hook is made is continued from the lower end of the open loop 12, concentric with the arm 11, almost its entire length, forming a lower arm 13, which at its upper end diverges from the upper arm and normally approaches the shank A, where it connects with the upper or locking loop 10. At the upper end of the lower arm 13 a horizontal link 14 is formed, through which the upper arm 11 is loosely passed, and preferably where the link 14 is normally located on the upper arm the said upper arm is given an outward bend 15, as shown particularly in Fig. 1.

When the hook is manipulated to receive the leg of an animal, the leg will freely pass the lower end of the lower arm 13 and adjacent portion of the shank and will enter the retaining or locking loop 10. As the leg enters the locking or retaining loop the lower arm 13 is pressed outward; but as soon as the leg of the animal is well within the retaining-loop 10 the lower arm 13 is restored to its normal position through the medium of the spring action of the lower open loop 12, and the link 14 will prevent the animal from working the leg out from the said retaining-loop.

The hook has its greatest elasticity at the lower loop 12, and the lower arm 13 is virtually a spring-arm; but the upper arm 11 need not necessarily have any spring action, and the material at the retaining-loop 10, as well as the material of the shank, is practically non-yielding.

This device is exceeding simple, it is durable and economic, and may be expeditiously and conveniently operated, with but little danger of injuring the animal, and when the animal has once been caught by the hook escape is practically impossible. When the leg is to be released, it is simply necessary to push the lower arm 13 in the direction of the upper arm 11.

Having thus described my invention, I claim as new and desire to secure by Letters Patent—

1. A sheep-hook provided with an open or retaining loop at one end of a shank, a downwardly and outwardly projecting arm extending from the loop, a spring-loop at the lower end of said arm, and an upwardly-projecting arm extending from the spring-loop up beneath the downwardly-projecting arm to a point adjacent to where the retaining-loop connects with the shank, substantially as described.

2. A sheep-hook, comprising a shank provided at one end with an open or retaining loop, a downwardly and outwardly projecting arm extending from the loop, a spring-loop at the lower end of said arm, an upwardly-projecting arm extending from the spring-loop up to a point adjacent to where the retaining-loop connects with the shank, and a link loosely connecting the free end of the upwardly-projecting arm with the downwardly-projecting arm, substantially as described.

3. A sheep-hook, consisting of a shank provided at one end with an open or retaining loop, a downwardly and outwardly projecting arm extending from the loop and provided adjacent thereto with an outward bend, a spring-loop at the lower end of said arm, an upwardly-projecting arm extending from the spring-loop up beneath the downwardly-projecting arm to a point adjacent to where the retaining-loop connects with the shank, and a link secured to the free end of said arm and through which the downwardly-projecting arm loosely passes, substantially as herein shown and described.

PHILIP I. MOULE.

Witnesses:
THOMAS ROSLING,
DONALD FOWLER.